United States Patent [19]

Ito et al.

[11] 4,105,847

[45] Aug. 8, 1978

[54] METHOD FOR POLYMERIZATION OF ETHYLENE

[75] Inventors: Akira Ito; Kenji Iwata, both of Yokohama, Japan

[73] Assignee: Mitsui Toatsu Chemicals Inc., Tokyo, Japan

[21] Appl. No.: 629,134

[22] Filed: Nov. 5, 1975

[30] Foreign Application Priority Data

[JP] Japan ..................................

[51] Int. Cl.$^2$ ........................... C08F 4/02; C08F 10/02
[52] U.S. Cl. ................................ 526/125; 252/429 B; 252/429 C; 526/128; 526/352; 526/906
[58] Field of Search ....................... 252/429 B, 429 C; 526/125, 128

[56] References Cited

U.S. PATENT DOCUMENTS

| | | | |
|---|---|---|---|
| 3,058,972 | 10/1962 | Foarcade et al. | 526/128 |
| 3,367,923 | 2/1968 | Tanaka et al. | 526/128 |
| 3,408,340 | 10/1968 | Tanaka et al. | 526/128 |
| 3,888,835 | 6/1975 | Ito et al. | 526/125 |

FOREIGN PATENT DOCUMENTS

| | | |
|---|---|---|
| 2,137,872 | 2/1972 | Fed. Rep. of Germany. |
| 2,504,036 | 8/1975 | Fed. Rep. of Germany. |
| 2,426,795 | 1/1975 | Fed. Rep. of Germany. |
| 5,028,479 | 9/1975 | Japan. |

Primary Examiner—Edward J. Smith
Attorney, Agent, or Firm—Fisher, Christen & Sabol

[57] ABSTRACT

Ethylene is polymerized or copolymerized with an α-olefin in the presence of a catalyst consisting of
(A) a co-comminuted composition of:
  (a) a titanium compound;
  (b) a magnesium halide; and
  (c) a siloxane polymer; and
(B) an organoaluminum compound.

8 Claims, No Drawings

METHOD FOR POLYMERIZATION OF ETHYLENE

BACKGROUND OF THE INVENTION

1. Field of the Invention

This invention relates to a method for the polymerization of ethylene and, more particularly, to a method for the polymerization or copolymerization of ethylene in the presence of a catalyst substantially composed of a titanium composition which is activated in a specific manner and an organoaluminum compound. All reference hereinafter to polymerization includes also copolymerization.

2. Description of the Prior Art

Several methods for the polymerization of ethylene are known using catalysts of the type which comprises a supported catalyst which is obtained by either supporting a titanium compound on or chemically combining a titanium compound with solid surfaces of various kinds of magnesium compounds, and an organometallic compound in combination therewith. With catalysts of the above-described type, although the polymerization rate of ethylene is increased, the resultant polymer disadvantageously has a low bulk density, so that it is almost impossible to increase concentration of the polymer per unit quantity of polymerization solvent and the rate of polymerization is considerably decreased with the passage of time resulting in extremely poor productivity.

In order to over come this disadvantage, U.S. Pat. No. 3,888,835 describes a method for polymerizing ethylene in the presence of a catalyst containing (a) a composition which is obtained by copulverizing a mixture of titanium tetrachloride or titanium trichloride, a magnesium halide and an aluminum halide-ether complex, and (b) an organoaluminum compound. By this method, polyethylene with high bulk density can be obtained at high yield. Such polyethylene, however, is disadvantageous for certain purposes since it has a rather wide molecular weight distribution. Accordingly, there is a great demand for an improved process for polymerizing ethylene enabling the production of polyethylene having a narrow molecular weight distribution. The present inventors have developed a catalyst useful for the polymerization of ethylene which is far improved over the prior art catalysts.

SUMMARY OF THE INVENTION

It is a primary object of the present invention to provide a method for polymerizing ethylene in an efficient manner by the use of a highly active catalyst. Use of the highly active catalyst of this invention ensures not only a high yield of polymer per unit quantity of catalyst, but also considerable reduction in the quantity of catalyst residue in the produced polymer. Accordingly, a step of removing the catalyst residue by washing is unnecessary or is simplified to a great extent, the polymerization method being very advantageous from a technical and economic standpoint as well as from the standpoint of necessary equipment.

It is another object of the present invention to provide a method for polymerizing ethylene whereby a polymer having a high bulk density is obtained. Formation of a polymer with a high bulk density makes it possible to increase the concentration of polymer per unit quantity of polymerization solvent. This assures not only good agitation and heat-removing effects, but also duration of the polymerization activity of catalyst over a long period of time, thus improving productivity of the polymer. In the copolymerization of ethylene with another monomer such as propylene, butene-1 or hexene-1, bulk density of the produced copolymer generally tends to decrease since the solvent resistance of the produced polymer is reduced and, therefore, the polymer is greatly swollen with polymerization solvent. However, the catalyst used in the present invention serves to yield a polymer having a high bulk density. Even in a copolymerization using a substantial amount of comonomer, reduction in the bulk density is small. In the present invention, a copolymer with low density can be produced with satisfactory production efficiency. This is true especially when a solvent having a low boiling point is used as polymerization solvent.

It is a further object of the present invention to provide a method for polymerizing ethylene whereby there can be obtained a polymer which is high in stereoregularity and narrow in distribution of its molecular weight. The activated titanium composition which is one component of the catalyst useful in the present invention is a ternary composition which is suitable for producing a polymer with high crystallinity and high density and which serves to suppress formation of a low molecular weight waxy polymer and a super high molecular weight polymer, both with poor regularity, the polymer obtained being narrow in distribution of molecular weight and excellent in physical properties. Other and more detailed objects and advantages will appear hereinafter.

According to the present invention, there is provided a method for polymerizing ethylene wherein the polymerization is effected in the presence of a catalyst composed of (A) an activated titanium composition which is obtained by mixing
(a) titanium tetrachloride, titanium trichloride or a titanium trichloride composition,
(b) a magnesium halide, and
(c) a siloxane polymer
and subjecting the mixture to copulverizing treatment, and (B) an organoaluminum compound.

The siloxane polymer which is one of the above components possesses the following four advantageous characteristics:

(1) Serves as an element for forming active sites on the ternary titanium composition.

The titanium active sites, which act as polymerization active sites whereupon ethylene polymerizes when combined with the organoaluminum compound, are formed from a ternary system consisting of a titanium chloride, a magnesium chloride and a siloxane polymer and are considered to have a chemical structure including titanium, magnesium, a halogen and a siloxane polymer. Although the exact structure of the active sites per se is not known at the present stage of investigation, elementary analysis and X-ray diffraction analysis of the catalyst of the invention reveal existence of the specific chemical structure indicated above. The titanium active sites of the ternary component system are so high in polymerization activity and in power for controlling stereo regularity that there can be efficiently obtained a polymer with good crystallinity and a narrow molecular weight distribution.

(2) Serves as an auxiliary agent for copulverizing.

In the copulverizing treatment for preparing the activated titanium composition, the siloxane polymer is in a viscous liquid state which acts to accelerate the copulverization of the magnesium halide and to finely powder the halide. Accordingly, the resultant activated titanium composition in the form of fine particles has a very high specific surface area, thus the number of polymerization active sites of the catalyst is increased to provide an increased rate of polymerization.

(3) Serves as a binding agent.

The siloxane polymer acts as a binding agent so that the fine powder or particles, obtained in the copulverizing step wherein solid materials are powdered by the copulverizing action of the siloxane polymer as described above, are in turn combined together to form granules due to coagulation of the fine particles when treated under specific copulverizing conditions, the apparent specific surface area of the thus formed granules being reduced to a considerable extent. When the finely powdered titanium composition as such is used for polymerization of ethylene, polymerization at an initial stage proceeds abruptly at a high reaction rate. As a result, the polymerization reaction does not proceed uniformly due to incomplete removal of heat in local areas and the resultant polymer disadvantageously has a very small bulk density. However, these disadvantages are overcome by granulation of the finely powdered titanium composition. Furthermore, the titanium active sites within the granules which are loosely covered with the siloxane polymer gradually release their polymerization ability as the polymerization reaction proceeds, with the result that the polymerization activity continues over a long period of time and the resultant polymer has a high bulk density.

(4) Serves as a protective agent.

The titanium active sites of the activated titanium composition are highly sensitive and may be deactivated even by a trace amount of oxygen, moisture or other impurities, and careful attention must be paid in storage and handling. However, since the titanium composition of the present invention is covered on the surfaces thereof with siloxane polymer which is stable against these impurities, deactivation during storage or in operation immediately before polymerization is prevented, even when the siloxane polymer-covered titanium composition is stored over a long period of time. The siloxane polymer is readily soluble in solvents usually employed in polymerization operation and is rapidly dissolved when the activated titanium composition covered with the siloxane polymer on surfaces thereof is introduced into the solvent, so that the titanium active sites appear and act as polymerization active sites when contacted with an organoaluminum compound.

DESCRIPTION OF THE PREFERRED EMBODIMENTS

The titanium compounds useful in the present invention include titanium tetrachloride and titanium trichloride. The term titanium trichloride includes titanium trichloride itself and titanium trichloride compositions which contain titanium trichloride as a main component, for example, a eutectic material obtained by reduction of titanium tetrachloride with a metal, a titanium trichloride composition obtained by reduction of titanium tetrachloride with a compound having an Si-H bond or an organoaluminum compound, and the like.

Examples of magnesium halides suitable for the practice of the invention are those which are substantially free from water, including preferably magnesium chloride and magnesium bromide.

As the siloxane polymer there are used, for example, alkylsiloxane polymers, arylsiloxane polymers, alkarylsiloxane polymers and the like, having the recurring unit

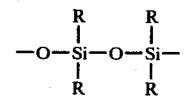

wherein R represents hydrogen, alkyl containing from 1 to 15 carbon atoms or aryl containing from 6 to 15 carbon atoms. Typical of the siloxane polymers are: alkylsiloxane polymers such as octamethyltrisiloxane, octamethyltetracyclosiloxane, dimethylpolysiloxane, ethylpolysiloxane, methylethylpolysiloxane and the like; arylsiloxane polymers such as hexaphenylcyclosiloxane, diphenylpolysiloxane and the like; and alkarylsiloxane polymers such as diphenyloctamethyltetrasiloxane, methylphenylpolysiloxane and the like. In practical application, silicon oils having viscosity of several centistokes to 1,000,000 centistokes at 25° C. may be used in the present invention.

The activated titanium composition of the invention preferably comprises 1-35% by weight titanium tetrachloride or 1-80% by weight titanium trichloride or titanium trichloride composition, 15-90% by weight of magnesium halide, and 5-50% by weight of siloxane polymer.

The copulverizing operation is generally effected under vacuum or in an atmosphere of an inert gas by use of a usual pulverizing machine such as a ball mill, vibration mill, column mill, jet mill and the like. The copulverizing operation should be conducted in the substantial absence of oxygen, moisture or similar impurity. Although the copulverizing temperature is not critical, it is generally in the range of −30° to 150° C. The pulverizing time is generally in the range of 1-100 hours. The manner or order of mixing the respective components is not particularly restricted.

The organoaluminum compound which is component (B) of the catalyst useful in the present invention is that expressed by the general formula $$AlR_nX_{3-n}$$

wherein R represents a hydrocarbon residue containing from 1 to 10 carbon atoms, X represents halogen, an alkoxy group containing from 1 to 10 carbon atoms, or hydrogen, and n is 1 to 3, and includes, for example, triethylaluminum, triisobutylaluminum, diethylaluminum monochloride, di-n-propylaluminum monochloride, diisobutylaluminum monochloride, diethylaluminum monohydride, diethylaluminum monoethoxide, ethylaluminum monoethoxymonochloride, ethylaluminum dichloride, ethylaluminum sesquichloride and the like, and mixtures thereof.

The ratio of components (A) and (B) of the catalyst used in the method of the present invention may be varied within a wide range. In general, the molar ratio of component (B) to component (A) is preferred to be in the range of 1-500.

The method of the present invention is applicable not only to homopolymerization of ethylene, but also to copolymerization of ethylene with other copolymerizable monomers. Monomers which are copolymerizable with ethylene are compounds expressed by the general formula $$RCH = CH_2$$

wherein R is a hydrocarbon residue containing from 1 to 10 carbon atoms, and includes, for example α-olefins such as propylene, butene-1, pentene-1, hexene-1 and 4-methyl-pentene-1, as well as styrene.

The polymerization reaction is carried out by a usual known method using usual reaction conditions. The polymerization temperature is generally in the range of 20°-300° C., preferably 50°-200° C., and the pressure is in the range of from normal pressure to 200 atm., preferably from normal pressure to 150 atm.

In the polymerization reaction, a solvent such as an aliphatic, alicyclic or aromatic hydrocarbon or mixture thereof is employed, and may be, for example, propane, butane, pentane, hexane, heptane, cyclohexane, benzene, toluene or mixtures thereof. Further, the polymerization reaction may be conducted in the gas phase wherein gaseous ethylene is directly contacted with the catalyst without use of a solvent.

The molecular weight of a polymer produced by the method of the invention varies depending on the manner of reaction, kind of catalyst and polymerization conditions. However, the molecular weight may be controlled by adding to the reaction system hydrogen, an alkyl halide, an alkyl zinc, if necessary.

The present invention will be particularly illustrated by way of the following illustrative examples.

EXAMPLE 1

2.4 g. of titanium tetrachloride, 23.0 g. of anhydrous magnesium chloride and 4.5 g. of dimethylpolysiloxane having a viscosity of 100 centistokes at 25° C. were introduced in an atmosphere of nitrogen into a vibration mill having an inner volume of 600 ml. in which about 80 steel balls with a diameter of 12 mm were placed, and were subjected to copulverizing at room temperature for 14 hours. The resulting powder was separated from the steel balls in an atmosphere of nitrogen to obtain an activated titanium composition with a Ti content of 2.02%.

Then, 1 liter of n-heptane, 31 mg of the activated titanium composition and 0.5 ml. of triisobutyl aluminum were charged into a stainless steel autoclave with an inner volume of 2 liters in an atmosphere of nitrogen. Then, nitrogen in the autoclave was replaced by hydrogen. Hydrogen was charged up to 2.5 kg/cm$^2$ and ethylene was then fed into the autoclave until the total pressure reached 6.0 kg/cm$^2$G. The autoclave was heated to raise the inner temperature up to 90° C. for commencing polymerization. During the polymerization, ethylene was continuously fed into the autoclave to maintain the inner pressure at 9.5 kg/cm$^2$G. 2.25 Hours after commencement of the polymerization, the feeding of ethylene was stopped and unreacted gas was discharged from the system. Then, 10 ml. of methanol was added to the reaction system, which was agitated for 30 minutes to decompose the catalyst. The absorption velocity of ethylene was 3.0 g/min at the time the feeding of ethylene was stopped.

Then, the autoclave was cooled and the content withdrawn, followed by filtration for removal of the solvent therefrom and drying at 60° C. under reduced pressure to obtain 525 g. of polyethylene. The thus obtained polyethylene had a bulk density of 0.40 and a limiting viscosity number of 1.72.

The polymerization activity of the catalyst in the polymerization reaction was 7.53 kg/g of cat.hr (wherein the term "cat" means the activated titanium composition and this will apply hereinafter) or 376 kg/g of Ti.hr, and the yield of polymer was 16.94 kg/g of cat or 827 kg/g of Ti.

The distribution of molecular weight of the polyethylene was determined by a gel-permeation chromatography using a 0.1 wt% solution in 1,2,4-trichlorobenzene. The ratio ($\overline{Mw}/\overline{Mn}$) of weight average molecular weight ($\overline{Mw}$) to number average molecular weight ($\overline{Mn}$) was 6.5.

Comparative EXAMPLE 1

For comparison, 2.4 g. of titanium tetrachloride and 27.5 g. of anhydrous magnesium chloride were placed in the same vibration mill and subjected to copulverizing treatment without use of dimethylpolysiloxane to obtain a titanium composition. Then, the polymerization reaction was carried out under the same conditions as in Example 1 using the above titanium composition. In this case, the initial activity of polymerization was relatively great. However, the resultant polymer was low in bulk density due to use of excessively fine powder of the composition. When the slurry concentration reached 250-300 g/l, the solvent was absorbed in the polymer. As a result, the reaction system became muddy and the polymerization reaction was almost stopped, the polymerization activity being low as a whole.

The activated titanium composition of Example 1 had a specific surface area of as small as 1.4 m$^2$/g, while the titanium composition of Comparative Example 1 not using dimethylpolysiloxane had a specific surface area of 70 m$^2$/g. In this connection, when the activated titanium composition of Example 1 was washed five times with heptane in an amount of ten times by weight of the amount of the composition at about 90° C., and dried under reduced pressure, its specific surface area was as large as 176 m$^2$/g, revealing that dimethylpolysiloxane was useful as a copulverizing auxiliary agent. Further, the specific surface areas of nonpowdered anhydrous magnesium chloride and powdered magnesium chloride were 0.5 and 31 m$^2$/g, respectively.

The reason why the specific surface area of the nonwashed activated titanium composition of Example 1 was as small as 1.4 m$^2$/g, in spite of the extremely large specific surface area of the washed product was due to the fact that magnesium chloride which was finely powdered by the copulverizing treatment was coagulated and granulated by the action of the dimethylpolysiloxane serving as a binding agent, thus decreasing the apparent specific surface area.

The weight ratios of the respective components which were calculated from the results of elementary analysis of the washed product were found to be TiCl$_4$:MgCl$_2$:dimethylpolysiloxane = 5.5:85.6:8.9. The titanium active sites of the activated titanium composition which were converted into polymerization active sites for polymerization of ethylene when combined with an organoaluminum compound were considered to have a chemical structure formed from the three components containing titanium, magnesium, chlorine and dimethylpolysiloxane.

The test results of Example 1 and Comparative Example 1 are shown in the following Table 1.

TABLE 1

| Example No. | Catalyst Activated titanium composition Composition (%) | | | Ti content (%) | Amount (g) | Amount of Al (isobutyl)$_3$ (ml) | Polymerization Time (hr) |
|---|---|---|---|---|---|---|---|
| | TiCl$_4$ | MgCl$_2$ | Dimethylpoly-siloxane | | | | |
| 1 | 8.0 | 76.9 | 15.1 | 2.02 | 0.031 | 0.5 | 2.25 |
| Comparative Example 1 | 8.0 | 92.0 | — | 2.01 | 0.033 | 0.5 | 1.75 |

| Example No. | Yield of Polyethylene (g) | Ethylene absorption velocity at suspension of polymerization (g/min) | Results of Polymerization | | | | | Limiting viscosity number | Bulk density (g/ml) | Mw/Mn | Density (g/ml) |
|---|---|---|---|---|---|---|---|---|---|---|---|
| | | | Activities | | Yield of polyethylene per unit catalyst or component | | | | | | |
| | | | kg/g of cat.hr | kg/g of Ti.hr | kg/g of cat. | kg/g of Ti. | kg/g of MgCl$_2$ | | | | |
| 1 | 525 | 3.0 | 7.53 | 376 | 16.94 | 847 | 22.0 | 1.72 | 0.40 | 6.5 | 0.970 |
| Comparative Ex. 1 | 295 | 0.5 | 5.11 | 254 | 8.94 | 445 | 9.7 | 1.68 | 0.26 | 9.3 | 0.968 |

EXAMPLES 2-1, 2-2, 2-3 and 2-4

Activated titanium compositions were prepared under the same procedure and conditions as in Example 1 using different amounts of titanium tetrachloride and dimethylpolysiloxane. Then, Example 1 was repeated using the resultant titanium compositions for polymerization of ethylene. The test results are shown in the following Table 2.

EXAMPLES 3-1 and 3-2

Activated titanium compositions were prepared according to the procedure of Example 1 using different kinds of siloxane polymers with different viscosities. The polysiloxane employed in Example 3-1 was a cyclic dimethylpolysiloxane mixture having a viscosity of 1.3 centistokes at 25° C. and a polymerization degree of 7-9 and that in Example 3-2 was a linear polysiloxane having a viscosity of 300 centistokes at 25° C. Then, Example 1 was repeated for polymerization of ethylene to obtain the results as shown in the following Table 3.

TABLE 2

| Example No. | Catalyst Activated titanium composition Composition (%) | | | Ti content (%) | Amount (g) | Amount of Al (isobutyl)$_3$ (ml) | Polymerization Time (hr) |
|---|---|---|---|---|---|---|---|
| | TiCl$_4$ | MgCl$_2$ | Dimethylpoly-siloxane | | | | |
| 2-1 | 4.1 | 81.0 | 14.9 | 1.04 | 0.048 | 0.5 | 2.30 |
| 2-2 | 4.0 | 85.8 | 10.2 | 1.01 | 0.046 | 0.5 | 2.40 |
| 2-3 | 8.2 | 81.5 | 10.3 | 2.07 | 0.033 | 0.5 | 2.15 |
| 2-4 | 11.9 | 78.3 | 9.8 | 3.0 | 0.026 | 0.5 | 2.25 |

| Example No. | Yield of Polyethylene (g) | Results of Polymerization | | | | | Limiting viscosity number | Bulk density (g/ml) | Mw/Mn | Density (g/ml) |
|---|---|---|---|---|---|---|---|---|---|---|
| | | Activities | | Yield of polyethylene per unit catalyst or component | | | | | | |
| | | Kg/g of cat.hr | Kg/g of ti.hr | Kg/g of cat. | Kg/g of Ti. | Kg/g of MgCl$_2$ | | | | |
| 2-1 | 507 | 4.59 | 442 | 10.55 | 1016 | 13.0 | 1.75 | 0.40 | 6.8 | 0.970 |
| 2-2 | 532 | 4.82 | 477 | 11.57 | 1145 | 13.5 | 1.65 | 0.39 | 6.9 | 0.963 |
| 2-3 | 508 | 7.16 | 346 | 15.38 | 743 | 18.9 | 1.72 | 0.40 | 6.7 | 0.971 |
| 2-4 | 512 | 8.75 | 292 | 19.69 | 656 | 25.1 | 1.62 | 0.38 | 7.1 | 0.969 |

TABLE 3

| Example No. | Catalyst Activated titanium composition Composition (%) | | | Ti content (%) | Amount (g) | Amount of Al (isobutyl)$_3$ (ml) | Polymerization Time (hr) |
|---|---|---|---|---|---|---|---|
| | TiCl$_4$ | MgCl$_2$ | Dimethylpoly-siloxane | | | | |
| 3-1 | 7.8 | 82.1 | 10.1 | 1.97 | 0.035 | 0.5 | 2.15 |
| 3-2 | 8.1 | 81.7 | 10.2 | 2.05 | 0.037 | 0.5 | 2.25 |

| Example No. | Yield of Polyethylene (g) | Results of Polymerization | | | | | Limiting viscosity number | Bulk density (g/ml) | Mw/Mn | Density (g/ml) |
|---|---|---|---|---|---|---|---|---|---|---|
| | | Activities | | Yield of polyethylene per unit catalyst or component | | | | | | |
| | | kg/g of cat.hr | kg/g of ti.hr | kg/g of cat. | kg/g of Ti. | kg/g of MgCl$_2$ | | | | |
| 3-1 | 525 | 6.60 | 335 | 14.19 | 720 | 17.28 | 1.63 | 0.40 | 6.8 | 0.970 |
| 3-2 | 530 | 6.37 | 311 | 14.33 | 700 | 17.54 | 1.78 | 0.39 | 6.7 | 0.967 |

EXAMPLE 4

2.5 g. of titanium tetrachloride, 24.5 g. of anhydrous magnesium chloride and 3.1 g. of dimethylpolysiloxane having a viscosity of 100 centistokes at 25° C. were placed in the same vibration mill as in Example 1 in an atmosphere of nitrogen and subjected to a copulverizing treatment at room temperature for 15 hours to obtain an activated titanium composition with a Ti content of 2.10 wt%.

Then, 1.3 kg of n-butane, 0.040 g. of the activated titanium composition and 20 ml. of an n-heptane solution containing 0.5 ml. of triethyl aluminum were introduced into a stainless steel autoclave having an inner volume of 5 liters in an atmosphere of nitrogen. Then, nitrogen in the autoclave was replaced by ethylene to which was added hydrogen under pressure until its partial pressure reached 3 kg/cm$^2$, followed by adding ethylene thereto up to a pressure of 12 kg/cm$^2$. The reaction system was heated to 85° C. for commencement of polymerization. Ethylene was continuously fed into the system in such a manner as to maintain the total pressure at 25 kg/cm$^2$ and the polymerization was continued for 2 hours.

Thereafter, Example 1 was repeated to obtain 1090 g. of white polyethylene powder. The thus obtained polyethylene had a limiting viscosity number of 1.23, a bulk density of 0.45 and $\overline{Mw}/\overline{Mn}$ of 7.2. The polymerization activity of the catalyst was very high as shown in the following Table 4.

EXAMPLE 5

Example 4 was repeated using a mixed gas of ethylene and propylene with a propylene content of 7% instead of ethylene alone. The resultant copolymer had a limiting viscosity number of 1.37, a density of 0.938, a number of methyl groups per 1000 carbon atoms of 18.3, and a bulk density of 0.37. The results of polymerization are also shown in Table 4.

EXAMPLES 6-1 and 6-2

Example 4 was repeated except that 50 g. or 100 g. of butene-1 was fed into the reaction system prior to the addition of hydrogen thereto and that ethylene/butene-1 were used instead of ethylene for copolymerization.

The copolymer obtained by use of the larger amount of butene-1 had a limiting viscosity number of 1.19, a density of 0.931, a number of methyl groups per 1000 carbon atoms of 10.3 and a $\overline{Mw}/\overline{Mn}$ ratio of 6.3.

In general, when a copolymer which contains such a large amount of butene-1 is synthesized by a slurry polymerization method using a usual catalyst and hexane or heptane as polymerization solvent, the bulk density thereof is low and part of the copolymer is swollen to give an extremely undesirable effect on the slurry reaction system, it being very difficult to effect the polymerization reaction in a uniform manner. On the other hand, use of the catalyst of the present invention results in formation of a copolymer with low density without any hindrance as will be clear from the results of these examples shown in Table 4.

TABLE 4

| Example No. | Catalyst | | | | | | | |
|---|---|---|---|---|---|---|---|---|
| | Activated titanium composition | | | | | Amount of Al (isobutyl)$_3$ (ml) | Amount of Comonomer (g) | Polymerization Time (hr) |
| | Composition (%) | | | Ti content (%) | Amount (g) | | | |
| | TiCl$_4$ | MgCl$_2$ | Dimethylpoly-siloxane | | | | | |
| 4 | | | | | 0.040 | 0.50 | — | 2.0 |
| 5 | 7.9 | 77.4 | 14.7 | 1.99 | 0.035 | 0.50 | propylene (7 mol%) | 2.0 |
| 6-1 | | | | | 0.035 | 0.50 | butene-1 50 | 2.0 |
| 6-2 | | | | | 0.033 | 0.50 | butene-1 100 | 2.0 |

| | Results of Polymerization | | | | | | | | | |
|---|---|---|---|---|---|---|---|---|---|---|
| | Yield of polymer | Activities | | Yield of polymer per unit catalyst or component | | | | Number of CH$_3$ | | |
| Example No. | Yield of polymer (g) | kg/g of cat.hr | kg/g of Ti.hr | kg/g of cat. | kg/g of Ti. | kg/g of MgCl$_2$ | Limiting viscosity number | Bulk density (g/ml) | groups per 1000 carbon atoms | Mw/Mn | Density (g/ml) |
| 4 | 1090 | 13.62 | 685 | 27.24 | 1370 | 35.19 | 1.23 | 0.45 | 0.3 | 7.0 | 0.970 |
| 5 | 1120 | 16.00 | 804 | 32.0 | 1608 | 41.34 | 1.37 | 0.37 | 18.3 | 6.5 | 0.938 |
| 6-1 | 1020 | 14.57 | 732 | 29.04 | 1464 | 37.52 | 1.22 | 0.39 | 6.3 | 6.6 | 0.942 |
| 6-2 | 1110 | 16.82 | 845 | 33.64 | 1690 | 43.46 | 1.19 | 0.38 | 10.3 | 6.3 | 0.931 |

EXAMPLE 7

Example 1 was repeated using 3.0 g. of AA type titanium trichloride (produced by Stauffer Chem. Co.), 22.5 g. of anhydrous magnesium chloride and 4.5 g. of dimethylpolysiloxane with a viscosity of 100 centistokes at 25° C., thereby to obtain an activated titanium composition with a Ti content of 2.53 wt.%.

The polymerization of ethylene was conducted in the same manner as in Example 1 using 40 mg. of the above activated titanium composition and a polymerization time of 2.5 hours to obtain 532 g. of polyethylene with a bulk density of 0.39 and a limiting viscosity number of 1.70. The polymerization activities of the catalyst used in this polymerization reaction were 6.65 kg/g of cat.hr and 263 kg/g of Ti.hr respectively, and the yields per unit catalyst or component were 16.6 kg/g of cat., and 658 kg/g of Ti. Further, the $\overline{Mw}/\overline{Mn}$ ratio of the polymer was 7.0.

The test results are shown in the following Table 5.

Having fully described our invention, it is to be understood that we are not to be limited to the details herein set forth but that our invention is of the full scope of the appended claims.

TABLE 5

| | Catalyst | | | | | | |
|---|---|---|---|---|---|---|---|
| | Activated titanium composition | | | | | | |
| | Composition (%) | | | | | Amount of Al | |
| Example No. | AA Type TiCl$_4$ | MgCl$_2$ | Dimethylpoly-siloxane | Ti content (%) | Amount (g) | (isobutyl)$_3$ (ml) | Polymerization Time (hr) |
| 7 | 10.0 | 75.0 | 15.0 | 2.53 | 0.040 | 0.5 | 2.5 |

| | | | Results of Polymerization | | | | | | |
|---|---|---|---|---|---|---|---|---|---|
| | | Ethylene absorption velocity at | Activities | | Yield of polyethylene per unit catalyst or component | | | | | |
| Example No. | Weight of Polyethylene (g) | suspension of polymerization (g/min) | kg/g of cat.hr | kg/g of Ti.hr | kg/g of cat. | kg/g of Ti. | kg/g of MgCl$_2$ | Limiting viscosity number | Bulk density (g/ml) | Mw/Mn | Density (g/ml) |
| 7 | 532 | 2.5 | 6.65 | 263 | 16.6 | 658 | 22.1 | 1.70 | 0.39 | 7.0 | 0.969 |

What is claimed is:

1. A process for polymerizing ethylene which comprises polymerizing or copolymerizing ethylene at a temperature of 20°–300° C. and a pressure of from normal pressure to 200 atm. in the presence of a catalyst consisting essentially of
   (A) a co-comminuted composition of the following components:
     (a) at least one component selected from the group consisting of titanium tetrachloride and titanium trichloride, said titanium tetrachloride comprising 1–35% by weight and said titanium trichloride comprising 1–80% by weight of component (A);
     (b) magnesium dihalide comprising 15–90% by weight of component (A); and
     (c) a siloxane polymer selected from the group consisting of an alkylsiloxane polymer, an arylsiloxane polymer and an alkarylsiloxane polymer having the following recurring unit

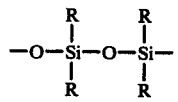

wherein R represents alkyl containing from 1 to 15 carbon atoms or aryl containing from 6 to 15 carbon atoms, said siloxane polymer comprising 5–50% by weight of component (A); and
   (B) an organoaluminum compound.

2. The process according to claim 1 wherein said organoaluminum compound is as expressed by the formula

wherein R repesents a hydrocarbon residue containing from 1 to 10 carbon atoms, X represents halogen, alkoxy containing from 1 to 10 carbon atoms or hydrogen, and n is from 1 to 3.

3. The process according to claim 1 wherein the molar ratio of component (B) to component (A) is in the range of 1–500.

4. The process according to claim 3 wherein component (A) is composed of 1–35% by weight of titanium tetrachloride, 15–90% by weight of magnesium dihalide and 5–50% by weight of siloxane polymer.

5. The process according to claim 3 wherein component (A) is composed of 1–80% by weight of titanium trichloride, 15–90% by weight of magnesium dihalide and 5–50% by weight of siloxane polymer.

6. A catalyst useful for polymerizing or copolymerizing ethylene consisting essentially of
   (A) a co-comminuted composition of the following components:
     (a) at least one component selected from the group consisting of titanium tetrachloride and, said titanium tetrachloride comprising 1–35% by weight and said titanium trichloride comprising 1–80% by weight of component (A);
     (b) magnesium dihalide comprising 15–90% by weight of component (A); and
     (c) a siloxane polymer selected from the group consisting of an alkylsiloxane polymer, an arylsiloxane polymer and an alkarylsiloxane polymer having the following recurring unit

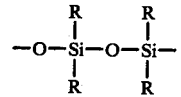

wherein R represents alkyl containing from 1 to 15 carbon atoms or aryl containing from 6 to 15 carbon atoms, said siloxane polymer comprising 5–50% by weight of component (A); and
   (B) an organoaluminum compound.

7. The catalyst according to claim 6 wherein component (A) is composed of 1–35% by weight of titanium tetrachloride, 15–90% by weight of magnesium dihalide and 5–50% by weight of siloxane polymer.

8. The catalyst according to claim 6 wherein component (A) is composed of 1–80% by weight of titanium trichloride, 15–90% by weight of magnesium dihalide and 5–50% by weight of siloxane polymer.

* * * * *

UNITED STATES PATENT OFFICE
CERTIFICATE OF CORRECTION

Patent No. 4,105,847　　　　　Dated August 8, 1978

Inventor(s) Akira ITO et al

It is certified that error appears in the above-identified patent and that said Letters Patent are hereby corrected as shown below:

On the Title page insert:

--[30] Foreign Application Priority Data

November 26, 1974　　Japan ........49-135136--

Signed and Sealed this

Twentieth Day of March 1979

[SEAL]

Attest:

RUTH C. MASON
Attesting Officer

DONALD W. BANNER
Commissioner of Patents and Trademarks